Oct. 5, 1954      B. V. HOARD      2,690,774
WIRE-TYPE POWER SAW
Filed Feb. 2, 1951
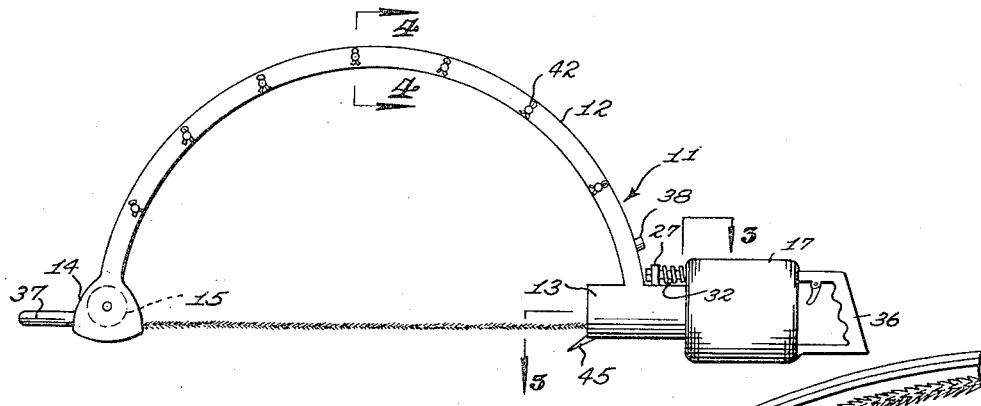
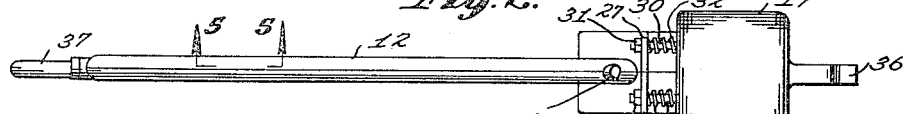
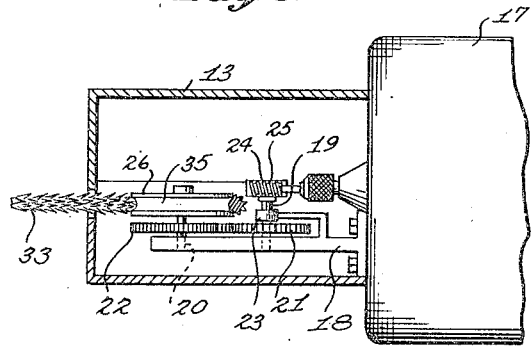
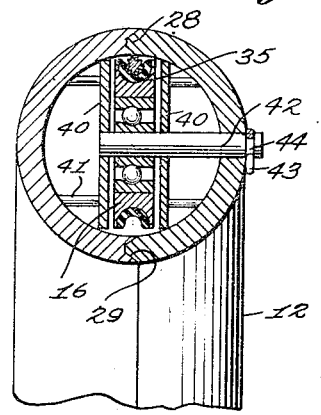
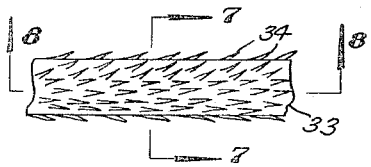
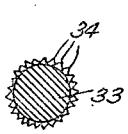
INVENTOR.
BERT V. HOARD
BY
McMorrow, Berman & Davidson
ATTORNEYS Patented Oct. 5, 1954

2,690,774

UNITED STATES PATENT OFFICE 2,690,774

WIRE-TYPE POWER SAW

Bert V. Hoard, Lilliwaup, Wash.

Application February 2, 1951, Serial No. 209,099

1 Claim. (Cl. 143—21)

This invention relates to power saws, and more particularly to a power saw of the type using a continuous endless blade.

A main object of the invention is to provide a novel and improved power saw which is simple in construction, which is easy to operate, which makes a narrow cut, whereby a relatively small driving motor may be employed, which cuts in any direction, and which is readily maneuverable for cutting in restricted locations.

A further object of the invention is to provide an improved power saw of the endless blade type which involves inexpensive components, which is rugged in construction, which can be used in cramped locations, which is safe to operate, which does not pinch or grab in the work being cut, and which may be easily operated by a single person.

Further objects and advantages of the invention will become apparent from the following description and claim, and from the accompanying drawings, wherein:

Figure 1 is a side elevational view of an improved power saw constructed in accordance with the present invention.

Figure 2 is a top plan view of the saw of Figure 1.

Figure 3 is an enlarged cross sectional view taken on line 3—3 of Figure 1.

Figure 4 is an enlarged cross sectional detail view taken on line 4—4 of Figure 1.

Figure 5 is an enlarged cross sectional detail view taken on line 5—5 of Figure 2.

Figure 6 is an enlarged fragmentary elevational view of a portion of the saw wire employed in the power saw of Figure 1.

Figure 7 is a cross sectional view taken on line 7—7 of Figure 6.

Figure 8 is a cross sectional view taken on line 8—8 of Figure 6.

Referring to the drawings, the power saw is designated generally at 11 and comprises a bowed tubular body 12 formed at one end with the enlarged tubular housing portion 13 and formed at the other end with the housing portion 14 located in alignment with housing 13. Journaled in the housing 14 is the peripherally grooved roller 15, and journaled in the body of the tubular member 12 at spaced intervals therein are additional peripherally grooved rollers 16. Designated at 17 is an electric motor which has secured to one end of its housing a bracket 18 which is received inside the housing 13 of the body 12. As shown in Figure 3, the bracket 18 extends parallel to the longitudinal axis of the body 13 and has journaled thereon the respective shafts 19 and 20. Secured on shaft 19 is a gear 21 which meshes with a gear 22 secured on shaft 20. Shaft 19 is rotatably supported at its intermediate portion in a bearing bracket 23 secured to the main bracket 18, said shaft having secured to its end a worm 24 which meshes with a worm 25 secured to the shaft of the motor 17. Secured on the shaft 20 is a peripherally grooved pulley 26 which is disposed in alignment with the pulley 15. The top wall of the housing 13 is formed with transverse rib elements 27, 27. From Figures 2 and 4 it will be seen that the body 12, the housing 14, and the housing 13 are defined by a pair of interfitting segments which join along the longitudinal central plane of the device. One of the segments has the beveled edges 28 and the other segment has the tapered grooves 29 in which the beveled edges 28 are receivable. The ribs 27, 27 are formed on the respective joining segments of the portions defining the housing 13, said ribs being in alignment, as shown in Figure 2. Designated at 30, 30 are respective bolts rigidly secured to the end wall of the motor 17 and extending through apertures in the respective ribs 27, 27. Nuts 31 are provided on the ends of the bolts 30 and coil springs 32 surround the bolts and bear between the rib segments 27 and the end wall of the motor 17, biasing the housing 13 away from the motor.

Designated at 33 is an endless wire which extends around the pulleys 14, 16, and 26, the wire 33 being held and tensioned by the biasing action of the springs 32, 32. As shown in Figures 6, 7 and 8, the wire 33 is formed along its length and around its surface with the saw teeth 34. To prevent injury to the saw teeth and to the various rollers 15, 16 and 26, the grooves of said rollers are provided with linings 35 of tough rubber or other suitable durable deformable material.

The motor 17 is provided at its outer end with the handle 36, so that the operator may grip the device at said handle. An additional handle 37 is provided on the housing 14, said handle being aligned with the exposed portion of the wire 33 and projecting forwardly from the housing 14. The handle 37 is provided so that an additional operator may support the forward end of the device while another operator supports the device at the handle 36, in the event that the device is employed for cutting trees of substantial size or other large objects. An internally threaded boss 38 is provided on the curved tubular body 12 adjacent the housing 13 for receiving an additional handle of the screw-end type, if the use of such a handle is desired.

The housing 13 is provided at its inner end with a downwardly and inwardly projecting anchoring prong 45.

In operation, the motor is energized and drives the pulley 26, causing the wire blade to be revolved in a counterclockwise direction, as viewed in Figure 1, around the pulleys 15, 16 and 26. The teeth 34 of the wire are arranged to project forwardly and outwardly, as in the manner of the teeth of a conventional saw blade. It will be apparent that cuts may be made in any desired direction inasmuch as teeth 34 are provided around the entire surface of the wire blade.

The guide pulley 16 may be supported inside the tubular body 12 in any suitable manner, as for example in the manner shown in Figure 4 by the provision of suitable parallel bracket plates 40, 40 secured in the body, as by the rivets 41, the pulleys 16 being journaled on shaft elements 42 extending through the wall of the body and through one of the bracket plates 40 and threadedly engaging the other bracket plate 40. The shaft 42 may be locked, in any suitable manner, as by the use of the resilient clamping rings 43 engaged in grooves 44 formed in the exposed end portions of said shafts.

When it is necessary to replace the blade 33, the spring fasteners 43 are removed, allowing the segments of the bowed tubular housing 12 to be separated, whereupon the old blade may be readily removed and a new blade may be inserted, the segments of the housing being joined together and secured by the use of the spring fasteners 43, after the substitution of the new blade for the old has been accomplished. It will be understood that the pulley 15 is journaled on a shaft which is secured to only one of the segments of the housing 14, whereby separation of the segments may be accomplished when the spring fasteners 43 are removed.

While a specific embodiment of an improved power saw has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A power saw comprising a tubular arcuately bowed member, respective pulleys journaled in the ends of said bowed member, a plurality of additional pulleys journaled at intervals throughout the length of said bowed member, whereby a flexible endless toothed wire may be engaged over said pulleys and extend through said tubular bowed member with a portion of said wire extending between the ends of the bowed member externally thereof, a motor secured to one end of the bowed member, and means drivingly coupling the motor to the pulley in said one end, whereby the wire is driven through the bowed member responsive to operation of the motor, said bowed member comprising a pair of arcuate segments, transverse shafts fixed to one of said segments, complementary openings in the other of said segments through which said shafts pass, and means on said shafts for retaining said segments in assembled relation, said pulleys being journaled on said shafts.

References Cited in the file of this patent

UNITED STATES PATENTS

| Number | Name | Date |
| --- | --- | --- |
| 152,970 | Chase | July 14, 1874 |
| 918,248 | Wysong | Apr. 13, 1909 |
| 1,303,809 | Lofgren | May 13, 1919 |
| 1,557,238 | Boerner | Oct. 13, 1925 |
| 2,525,004 | Spang | Oct. 10, 1950 |
| 2,593,760 | James | Apr. 22, 1952 |
| 2,604,910 | Crosby | July 29, 1952 |

FOREIGN PATENTS

| Number | Country | Date |
| --- | --- | --- |
| 60,044 | Austria | July 10, 1913 |